US007650563B2

(12) United States Patent
Plastina et al.

(10) Patent No.: US 7,650,563 B2
(45) Date of Patent: Jan. 19, 2010

(54) AGGREGATING METADATA FOR MEDIA CONTENT FROM MULTIPLE DEVICES

(75) Inventors: Daniel Plastina, Sammamish, WA (US); Kasy Srinivas, Sammamish, WA (US); Praveen Singh Rao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 845 days.

(21) Appl. No.: 10/873,599

(22) Filed: Jun. 22, 2004

(65) Prior Publication Data
US 2005/0015713 A1 Jan. 20, 2005

Related U.S. Application Data

(63) Continuation-in-part of application No. 10/623,471, filed on Jul. 18, 2003, now Pat. No. 7,392,477.

(51) Int. Cl.
*G06F 7/00* (2006.01)
*G06F 15/00* (2006.01)
(52) U.S. Cl. .................. 715/205; 715/201; 715/255; 715/234; 707/3; 707/104.1
(58) Field of Classification Search ............... 715/500, 715/501.1, 513, 200, 201, 202, 203, 205, 715/210, 226, 231, 234, 247, 253, 255, 256, 715/273, 700, 727, 737, 738, 760, 968; 709/217; 713/164, 176; 704/104.1, E17.108, E17.109; 707/1, 3–7, 104, 104.1
See application file for complete search history.

(56) References Cited

U.S. PATENT DOCUMENTS 6,248,946 B1    6/2001   Dwek 6,389,467 B1 *  5/2002   Eyal ........................ 709/223

(Continued)

FOREIGN PATENT DOCUMENTS

EP     1452978 A  *  1/2004

(Continued)

OTHER PUBLICATIONS

Bohm et al., "Metadata for Multimedia Documents", GMD Integrated Publication and Information Systems Institute, vol. 23, No. 4, Dec. 1994, pp. 21-26.*

(Continued)

*Primary Examiner*—Laurie Ries
*Assistant Examiner*—MaiKhanh Nguyen
(74) *Attorney, Agent, or Firm*—Senniger Powers LLP

(57) ABSTRACT

Collecting and augmenting metadata associated with media content stored on a plurality of devices for display to a user. The collected metadata remains available (e.g., visible) to a user after the device storing the corresponding media content is offline, disconnected, or otherwise unavailable. In particular, the invention permits metadata associated with media content stored on one or more devices (e.g., consumer electronic devices) to be enumerated, obtained, and promoted into another device (e.g., a personal computer) such that the metadata may be treated as if the media content is stored on the other device (e.g., the personal computer). In particular, the invention automatically detects an event generated in response to an action by a first device storing a media file. In response to the detected event, the invention matches and obtains metadata for the media content stored in the media file. A user organizes or otherwise manipulates the obtained metadata, for example, via a media player.

29 Claims, 4 Drawing Sheets

U.S. PATENT DOCUMENTS

| | | | |
|---|---|---|---|
| 6,393,430 B1* | 5/2002 | Van Ryzin | 707/104.1 |
| 6,449,627 B1 | 9/2002 | Baer et al. | |
| 6,505,160 B1 | 1/2003 | Levy et al. | |
| 6,549,922 B1* | 4/2003 | Srivastava et al. | 707/205 |
| 6,553,404 B2 | 4/2003 | Stern | |
| 6,560,607 B1 | 5/2003 | Lassesen | |
| 6,587,837 B1 | 7/2003 | Spagna et al. | |
| 6,748,395 B1* | 6/2004 | Picker et al. | 707/102 |
| 6,760,721 B1* | 7/2004 | Chasen et al. | 707/3 |
| 6,829,368 B2 | 12/2004 | Meyer et al. | |
| 6,973,451 B2 | 12/2005 | Laronne et al. | |
| 7,107,272 B1* | 9/2006 | Milligan et al. | 707/10 |
| 7,136,866 B2 | 11/2006 | Springer, Jr. et al. | |
| 7,191,190 B2* | 3/2007 | Debique et al. | 709/231 |
| 7,272,613 B2* | 9/2007 | Sim et al. | 707/102 |
| 7,293,227 B2* | 11/2007 | Plastina et al. | 707/E17.02 |
| 7,403,769 B2 | 7/2008 | Kopra et al. | |
| 2001/0031066 A1 | 10/2001 | Meyer et al. | 382/100 |
| 2002/0010759 A1 | 1/2002 | Hitson et al. | |
| 2002/0033844 A1 | 3/2002 | Levy et al. | |
| 2002/0055951 A1 | 5/2002 | Shigetomi et al. | |
| 2002/0099737 A1* | 7/2002 | Porter et al. | 707/513 |
| 2002/0103920 A1* | 8/2002 | Berkun et al. | 709/231 |
| 2002/0143976 A1* | 10/2002 | Barker et al. | 709/231 |
| 2002/0147728 A1* | 10/2002 | Goodman et al. | 707/104.1 |
| 2002/0178276 A1* | 11/2002 | McCartney et al. | 709/231 |
| 2002/0184180 A1* | 12/2002 | Debique et al. | 707/1 |
| 2002/0194480 A1 | 12/2002 | Nagao | |
| 2003/0078986 A1 | 4/2003 | Ayres et al. | |
| 2003/0079038 A1* | 4/2003 | Robbin et al. | 709/232 |
| 2003/0093790 A1* | 5/2003 | Logan et al. | 725/38 |
| 2003/0120928 A1* | 6/2003 | Cato et al. | 713/176 |
| 2003/0163399 A1 | 8/2003 | Harper et al. | |
| 2003/0174861 A1 | 9/2003 | Levy et al. | |
| 2003/0182139 A1* | 9/2003 | Harris et al. | 705/1 |
| 2003/0182315 A1 | 9/2003 | Plastina et al. | |
| 2004/0002993 A1* | 1/2004 | Toussaint et al. | 707/104.1 |
| 2004/0017997 A1 | 1/2004 | Cowgill | |
| 2004/0024875 A1 | 2/2004 | Horvitz et al. | |
| 2004/0122917 A1* | 6/2004 | Menon et al. | 709/219 |
| 2004/0177319 A1 | 9/2004 | Horn | |
| 2004/0186993 A1* | 9/2004 | Risan et al. | 713/164 |
| 2004/0260786 A1* | 12/2004 | Barile | 709/217 |
| 2004/0267693 A1* | 12/2004 | Lowe et al. | 707/1 |
| 2004/0268386 A1* | 12/2004 | Logan et al. | 725/34 |
| 2005/0091268 A1 | 4/2005 | Meyer et al. | |
| 2005/0165795 A1* | 7/2005 | Myka et al. | 707/100 |
| 2008/0212944 A1* | 9/2008 | Khedouri et al. | 386/124 |

OTHER PUBLICATIONS

E. Swierk et al., "The Roma Personal Metadata Service", Dec. 2000, pp. 107-116.*

Altman, Micah et al., "Overview of the Virtual Data Center Project and Software", Proceedings of the First ACM/IEEE-CS Joint Conference on Digital Libraries, 2001, pp. 203-204, ACM Press, New York.

Baldonado, Michelle et al., "Metadata for Digital Libraries: Architecture and Design Rationale", Proceedings of the Second ACM International Conference on Digital Libraries, 1997, pp. 47-56, ACM Press, New York.

Geisler, Gary et al., "Creating Virtual Collections in Digital Libraries: Benefits and Implementation Issues", Proceedings of the Second ACM/IEEE-CS Joint Conference on Digital Libraries, 2002, pp. 210-218, ACM Press, New York.

Greer, Lyndsay R., "The Learning Matrix: Cataloging Resources With Rich Metadata", Proceedings of the Second ACM/IEEE-CS Joint Conference on Digital Libraries, 2002, p. 375, ACM Press, New York.

Minibayeva et al., "A Digital Library Data Model for Music," Proceedings of the Second ACM/IEEE-CS Joint Conference on Digital Libraries, 2002, pp. 154-155, ACM Press, New York.

Roantree, Mark, "Metadata Management in Federated Multimedia Systems", Proceedings of the Thirteenth Australasian Conference on Database Technologies, 2002, pp. 147-155, vol. 5, Australian Computer Society, Inc., Australia.

Swierk, Edward et al., "The Roma Personal Metadata Service", Mobile Networks and Applications, 2002, pp. 407-418, vol. 7, Issue 5, Kluwer Academic Publishers, Massachusetts.

Vaduva, Anca et al., "M$^4$: A Metamodel For Data Preprocessing", Proceedings of the 4th ACM International Workshop on Data Warehousing and OLAP, 2001, pp. 85-92, ACM Press, New York.

"Playlist Element", Windows Media Player SDK, available at http://msdn.microsoft.com/library/en-us/wmplay/mmp_sdk/playlistelement.asp?frame=true, printed May 27, 2004, 3 pages, Microsoft Corporation, USA.

Witten, Ian H. et al., "Greenstone: A Comprehensive Open-Source Digital Library Software System", Proceedings of the Fifth ACM Conference on Digital Libraries, 2000, pp. 113-121, ACM Press, New York.

* cited by examiner

AGGREGATING METADATA FOR MEDIA CONTENT FROM MULTIPLE DEVICES

CROSS-REFERENCE TO RELATED APPLICATION

This application is a continuation-in-part of co-pending U.S. patent application Ser. No. 10/623,471, filed Jul. 18, 2003, entitled "RESOLVING METADATA MATCHED TO MEDIA CONTENT," the entire disclosure of which is incorporated herein by reference.

TECHNICAL FIELD

Embodiments of the present invention relate to the field of media content. In particular, embodiments of this invention relate to obtaining and aggregating metadata for media content stored on a plurality of devices.

BACKGROUND OF THE INVENTION

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Many computers are also equipped with digital versatile disc (DVD) drives enabling users to watch movies.

In some multimedia environments, a computer has access to a computer-readable medium storing compressed media files. Common media file types include Moving Picture Experts Group audio layer-3 (MP3) files and WINDOWS MEDIA® technologies audio (WMA) and video (WMV) files. The computer typically organizes the media files into playlists when the compressed media files are played on the computer. The files may be organized according to metadata or other property data associated with the media content. Metadata for a digital media file such as an audio file usually includes general information pertaining to the media file itself. This information is typically stored within the file. For example, an audio file may have metadata tags for the song title, song artist, album title, and a rating. In another example, in the case of audio media files, the files may be organized by album, artist, genre, date, or some user-specified selection and ordering of metadata. A user navigates through this organization using menus and graphical displays to render the desired media files.

Often, users store media content on a variety of devices including personal computers, portable consumer electronic devices (e.g., MP3 players), removable hard drives, and network shares. Many of these devices have limited capabilities for metadata processing, updating, using, and querying, while other devices have no such capabilities at all. There is a need for a system that enables the central organization of media content stored on a plurality of devices even if all the media content is not physically stored on the same device (e.g., a computer-readable medium). Further, there is a need for a system that permits metadata for media content stored on a device external to a computing device to be augmented and promoted into the computing device such that the metadata may subsequently be treated (e.g., organized) as if the media content is stored on the computing device.

Accordingly, a system for creating entities on a device that mirror media content stored on a plurality of other devices is desired to address one or more of these and other disadvantages.

SUMMARY OF THE INVENTION

Embodiments of the invention include methods for promoting media content to end users through augmentation of metadata associated with the media content. For example, one embodiment of the invention permits metadata for media content stored on a device to be enumerated and promoted into another device (e.g., for display to a user) such that the metadata may be treated as if the media content is actually stored on the other device. The metadata is available to the user even after the device is disconnected or otherwise inaccessible by the other device. Some computing devices (e.g., personal computers) are able to display far richer metadata for the media content than what was presented to the computing device by another computing or storage device. Promoting or virtualizing metadata from a plurality of computing or storage devices into a central device for display to the user enables the creation of a virtual media library on the central device. Including such extended metadata on items of media content is very important to the digital media user. In one embodiment, the virtual media library permits user interaction with metadata for media collections on a personal computer and with metadata for media collections on external devices to occur in a seamless and highly interrelated manner to afford the user a rich media experience by abstracting access to the media collections.

In accordance with one aspect of the invention, a method collects metadata for media content stored on a plurality of devices. The method includes automatically detecting an event generated in response to an action by a first device. The first device has a media file stored thereon. The method also includes determining an identifier associated with the media file in response to the detected event. The method further includes obtaining metadata for the media file from a metadata provider using the determined identifier. The method stores the obtained metadata in a memory area associated with a second device and enables a user to manipulate the stored metadata.

In accordance with another aspect of the invention, one or more computer-readable media have computer-executable components for collecting metadata for media content stored on a plurality of devices. The components include a driver component for automatically detecting a connection from a first device upon creation of the connection by the first device storing a media file. The components further include an identification component for identifying metadata associated with media content stored in the media file. The components further include a retrieval component for obtaining from a metadata provider the metadata identified by the identification component for the media content. The components also include a storage component for storing the metadata obtained by the retrieval component in a memory area associated with a second device. The components also include an application component for enabling a user to manipulate the metadata stored by the storage component.

In accordance with yet another aspect of the invention, a system collects metadata for media content stored on a plurality of devices. The system includes a memory area for storing metadata for media content. The media content is stored on a first device. The memory area is associated with a second device. The system also includes a processor configured to execute computer-executable instructions for automatically detecting a connection from a first device upon creation of the connection by the first device having media content stored thereon. The computer-executable instructions also include identifying metadata associated with the media content in response to the detected connection. The computer-executable instructions further include obtaining the identified metadata for the media content from a metadata provider. The computer-executable instructions include storing the obtained metadata in a memory area associated with a second device. The computer-executable instructions include displaying the stored metadata to a user and altering the display of the stored metadata responsive to termination of the connection.

In accordance with still another aspect of the invention, an operating system has an event handler associated therewith. The event handler has computer-executable instructions for automatically detecting a connection from a first device upon creation of the connection by the first device having a media file stored thereon. The computer-executable instructions determine an identifier associated with the media file in response to the detected connection. The computer-executable instructions obtain the metadata for the media file from a metadata provider using the determined identifier. The computer-executable instructions store the obtained metadata in a memory area associated with a second device. The computer-executable instructions enable a user to manipulate the stored metadata via an application program associated with the second device.

In accordance with another aspect of the invention, a method collects metadata for media content stored on a plurality of devices. The method includes automatically detecting an event generated in response to an action by a first device. The first device stores a media file. The media file includes media content. The method also includes matching metadata to the media content in response to the detected event. The method further includes obtaining the matched metadata from a metadata provider. The method stores the obtained metadata in a memory area associated with a second device and enables a user to manipulate the stored metadata.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
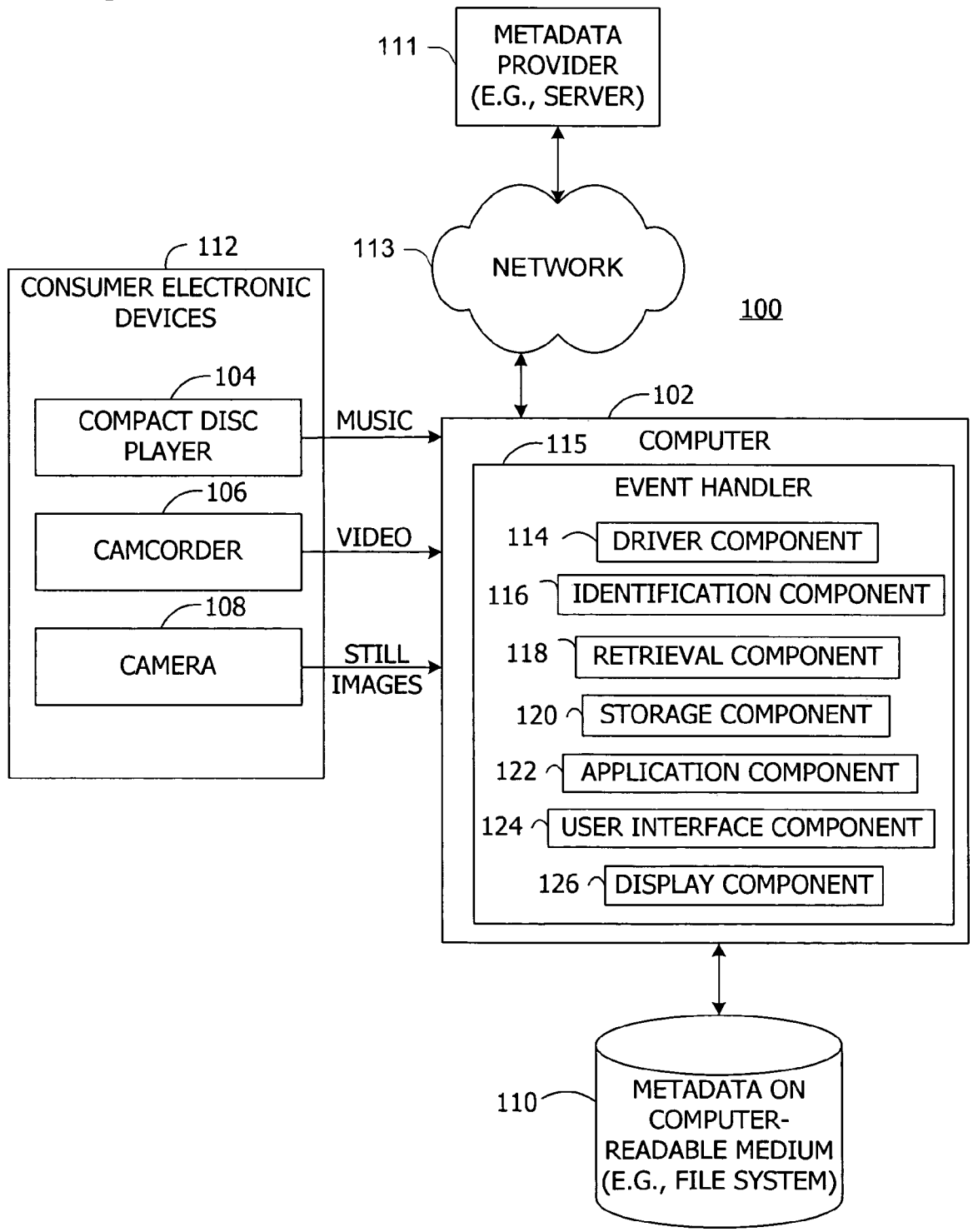
FIG. 1 is a block diagram illustrating one example of a suitable media environment in which the invention may be implemented.

Referring now to the drawings, FIG. 1 illustrates an exemplary multimedia environment in which the invention may be used. Portable consumer electronic devices generally have limited capabilities for processing, updating, using and querying metadata associated with media content stored by the devices. Embodiments of the invention permit metadata associated with various forms of media content stored on one or more devices to be enumerated and promoted into another device. In this manner, the metadata may be treated as if the media content is actually stored on the other device. For example, metadata associated with media content stored on a plurality of devices may be aggregated on a central device (e.g., a personal computer) at the same time. The metadata aggregated from the plurality of devices remains visible to a user of the central device even after the device actually storing the media content associated with the metadata is disconnected from the central device.

A user may organize or otherwise manipulate the metadata using, for example, a media player. In one embodiment, the invention includes copying or promoting metadata for media content stored on media devices such as the portable consumer electronic devices to another device such as the personal computer or other computing device. By aggregating metadata from these sources into a common repository on the computing device the invention provides substantial functional parity among the consumer electronic devices and the computing device. The computing device treats the metadata promoted by one of the consumer electronic devices as if the metadata were associated with media content stored by the computing device. For example, a user of the computing device is able to organize, rate, and otherwise manipulate the promoted metadata.

The invention also augments the metadata by obtaining updated metadata or additional metadata associated with the media content for those computing devices (e.g., personal computers) that are able to display far richer metadata than what was presented to the computing device by the portable consumer electronic devices. In an embodiment of this invention, the personal computer enriches the enumerated media content by offering to update the media content stored on the consumer electronic device with new, additional, updated, corrected, or extended metadata. Another improvement involves allowing the personal computer to offer behaviors or features such as "Play songs on this device that sound like each other."

Exemplary Media Environment

Referring further to the exemplary multimedia environment of FIG. 1, a system 100 has one or more computers 102 coupled to one or more consumer electronic devices 112 providing media content including audio data, video data, and/or image data. For example, the devices 112 may include a compact disc (CD) player 104, a camcorder 106, or a camera 108. Additionally, the devices 112 may include other personal computers, removable hard drives, network shares, a Moving Picture Experts Group audio layer-3 (MP3) player, an audio system in an automobile, a personal digital assistant, a cellular telephone, or the like. The consumer electronic devices 112 may include any suitable rendering filter or media player or device that is configured to render digital media so that the user can experience the content that is embodied on the consumer electronic device 112. For example, suitable media player applications include a CD media player and a DVD media player.

In this environment, the computer 102 stores, on a computer-readable medium 110, only the metadata for the media content that is stored on the consumer electronic devices 112. That is, in one embodiment, the computer 102 does not store the media content from the consumer electronic device 112. The computer 102 may, however, store other media content on the medium 110 for use by a media player program associated with the computer 102. In this manner, the medium 110 acts as a central metadata repository for metadata for media content stored on medium 110 as well as for metadata for media content stored on another device.

One aspect of the present invention enables the user or, particularly, enables a media player program executing on computing device 112 or client, to access, retrieve, and display for the user, so-called metadata. Those skilled in the art are familiar with metadata, which is simply information about data. In the context of the illustrated embodiment, metadata includes information related to specific content of a digital media file being played on the media player. Basic metadata includes, but is not limited to, a title, performer, genre, a track number, and the like. Extended metadata includes, but is not limited to, cover art, a composer, description of content, performer biographies, reviews, ratings, related performers, where to buy similar items, upcoming concerts, ticket sales, URLs to other related experiences including purchase opportunities, a studio, a director, and the like. In one embodiment, extended metadata may be organized into two main categories: metadata retrieved or downloaded, and metadata computed from the media file (e.g., digital signal processing of the file stream).

The user of consumer electronic device 112 connects the device 112 storing a digital media file to computer 102, or otherwise causes the device 112 to communicate with the computer 102, which in turn generates an event. Computer 102 has a processor configured to execute computer-executable instructions. In the embodiment of FIG. 1, the computer 102 includes several computer-executable components implementing an event handler 115 for processing the generated event. The components include a driver component 114, an identification component 116, a retrieval component 118, a storage component 120, an application component 122, a user interface component 124, and a display component 126. As described in greater detail herein, the driver component 114 automatically detects an event generated in response to an action by one of the consumer electronic devices 112. The identification component 116 determines an identifier associated with a media file stored on the device 112. The retrieval component 118 obtains metadata for the media file from a metadata provider 111 using the determined identifier. The metadata provider 111 matches metadata to the specific media content stored on the consumer electronic device 112. Metadata provider 111 communicates the metadata to computer 102. The metadata provider 111 includes any source that provides metadata or other property data including, but not limited to, a human operator, a local cache, a media library, or a remote server.

The storage component 120 shown in FIG. 1 stores the obtained metadata in a memory area associated with computer 102. The application component 122 enables a user to manipulate the stored metadata. The user interface component 124 prompts a user to determine whether to obtain via the retrieval component 118 the metadata associated with the media file from the metadata provider. The display component 126 displays the obtained metadata to the user.

Those skilled in the art will note that the invention software may be implemented with any number and organization of components or modules. That is, the invention is not limited to the specific configuration of components 114, 116, 118, 120, 122, 124, and 126, but may include more or less components having more or less individual functionality than described herein. For example, the event handler illustrated in FIG. 1 may encompass a single event handler processing events from all consumer electronic devices. Alternatively, the event handler may include a plurality of event handlers each specific to one or more of the consumer electronic devices. In addition, the components may be part of an operating system associated with computer 102, or may be part of an application program separate from the operating system.

In one example, the metadata is available from the metadata provider 111 via a data communication network 113. The computer 102 and metadata provider 111 are coupled to the data communication network 113. While the network 113 includes the Internet in one example, the teachings of the invention may be applied to any data communication network. Data communication network 113 may support, for example, client/server communications or peer-to-peer connections.

In the examples herein, the media content of the digital media file is described in the context of content embodied on a CD or a DVD. It is to be appreciated and understood that the media content may be embodied on any suitable media and that the specific examples described herein are given to further understanding of the inventive principles. For convenience, a digital media file refers to one or more files representing, for example, a single song track or a collection of tracks such as would be found on an audio CD. The media content may include, without limitation, specially encoded media content (e.g., audio, video, or still images) in the form of an encoded media file.

Aggregating Metadata

Figure 2:
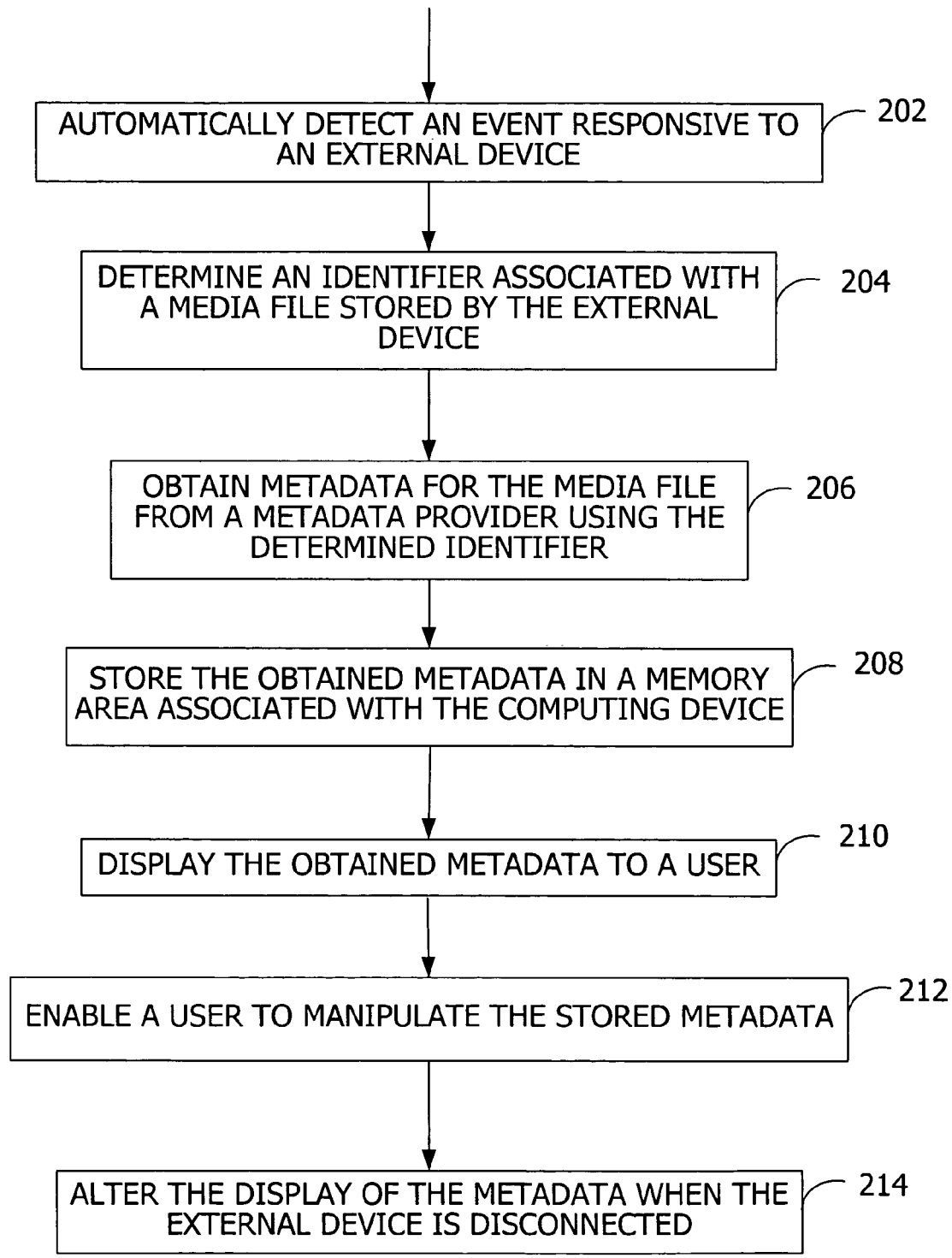
FIG. 2 is a flow chart illustrating operation of an exemplary event handler of the invention.

Referring next to FIG. 2, a flow chart illustrates operation of an exemplary event handler executing on a central device (e.g., a personal computer). The event handler enables the creation of a database or other memory area storing metadata for media content and storing source information identifying the consumer electronic device storing the actual media content. A user is then able to process the database information to perform metadata lifecycle actions such as augmentation of the database information or further integration of the database information into a media library associated with the database. In one embodiment, the source information enables a central device to playback a media file stored in the consumer electronic device so long as the consumer electronic device is connected to the central device.

In FIG. 2, the illustrated method of the invention collects metadata for media content stored on a plurality of devices (e.g., consumer electronic devices) and creates metadata records or other entries for the media content into a file system of the central device. In general, an event handler of the invention executes to process events (e.g., device events, autoplay events, and change/notify events). The events may be categorized in one embodiment as events indicating a change in scope (e.g., a new device has been connected) or events indicating no change in scope (e.g., the same device, but new content). The event may include one or more of the following: a device event, an autoplay event, a change event, and a notify event. In one embodiment, an event is generated in response to the storage of another media file on the consumer electronic device.

The method automatically detects an event generated in response to an action by a first device (e.g., a consumer electronic device) at 202. The consumer electronic device stores a media file. In one embodiment, automatically detecting the event includes automatically detecting a connection from one or more of the following: a consumer electronic device, a portable device, an external device, a handheld device, a computing device, and a storage device. For example, automatically detecting the event may include automatically detecting the insertion of a compact disc into a personal computer. Generating an event based on an action such as this is well known in the art.

The invention matches metadata to the media content in response to the detected event. There are numerous ways known in the art to match metadata to media content. For example, the media content may store a persisted identifier which may be matched to metadata. In another example, metadata may be identified by brute force matching using only bibliographic metadata obtained from the media content (or file storing the media content). In this example, fuzzy means may be employed to perform the matching. The invention is operable with all such means for matching metadata to the media content.

In the specific example of FIG. 2, the method matched metadata to the media content by determining an identifier associated with the media file in response to the detected event at 204. In one embodiment, the method determines the identifier associated with the media file by querying the consumer electronic device or accessing data stored on a computer-readable medium associated with the consumer electronic device. Determining an identifier associated with a computer-readable medium storing media content is well known in the art.

In one specific example, a table of contents (TOC) value takes the form of a physical identifier for a compact disc identifying the specific digital media file based on the offsets of each track on the disc. The TOC, defined by a well-known specification referred to as the Red Book, identifies audio CD-based absolute times for the start of each track. The TOC, found in the CD's lead-in area, is expected to be the same for all like-entitled CDs published from the same source.

The method sets forth obtaining metadata for the media file from a metadata provider using the determined identifier at 206. Co-pending U.S. patent application Ser. No. 10/623,471, filed Jul. 18, 2003, entitled "RESOLVING METADATA MATCHED TO MEDIA CONTENT," previously incorporated herein by reference, describes a methodology for obtaining metadata for the media file from a metadata provider using the determined identifier. In one embodiment, obtaining the metadata is device specific or specific to the media content. As such, this embodiment of the invention identifies the device or media content (e.g., by extracting an identifier), and obtains the metadata using the extracted identifier. For example, the method sends the extracted identifier to a web service to obtain the metadata. Alternatively or in addition, the method may obtain or receive the metadata from the consumer electronic device and/or the media content or file directly. In one embodiment, the method prompts the user to determine whether to obtain the metadata associated with the media file prior to actually obtaining the metadata. The method receives a determination from the user in response.

At 208, FIG. 2 illustrates storing the obtained metadata in a memory area associated with the second device (e.g., the central device). For example, the method may store the metadata in a memory area (e.g., a file system) accessible by or otherwise associated with a media player for the central device. In an alternative embodiment, the method obtains the metadata, displays the obtained metadata to the user, and prompts the user to determine whether to add the obtained metadata to local storage (e.g., add to a media library associated with the consumer electronic device).

If the consumer electronic device has write capability, the media content may be enhanced by updating the files on the consumer electronic device with the obtained (e.g., extended) metadata and enabling behaviors such as "play songs on this device that sound like each other." In this embodiment, the method stores the obtained metadata on the consumer electronic device as soon as the metadata has been received to aid synchronization of the metadata between the central device and the consumer electronic device.

The central device displays the obtained metadata at 210 and enables the user to manipulate the metadata at 212 as if the media content associated with the metadata were stored on the central device. For example, the obtained metadata is displayed to the user via a media player. When the consumer electronic device is disconnected from the central device, the method automatically alters the display of the metadata items associated with the disconnected device at 214. That is, the user does not first need to attempt to render the media content before being informed of the unavailability of the media content. Altering or "ghosting" the display of the metadata from the disconnected device includes dimming, shading, tinting, bolding, italicizing, or the like, the displayed metadata.

One or more computer-readable media have computer-executable instructions for performing the method illustrated in FIG. 2.

Figure 3:
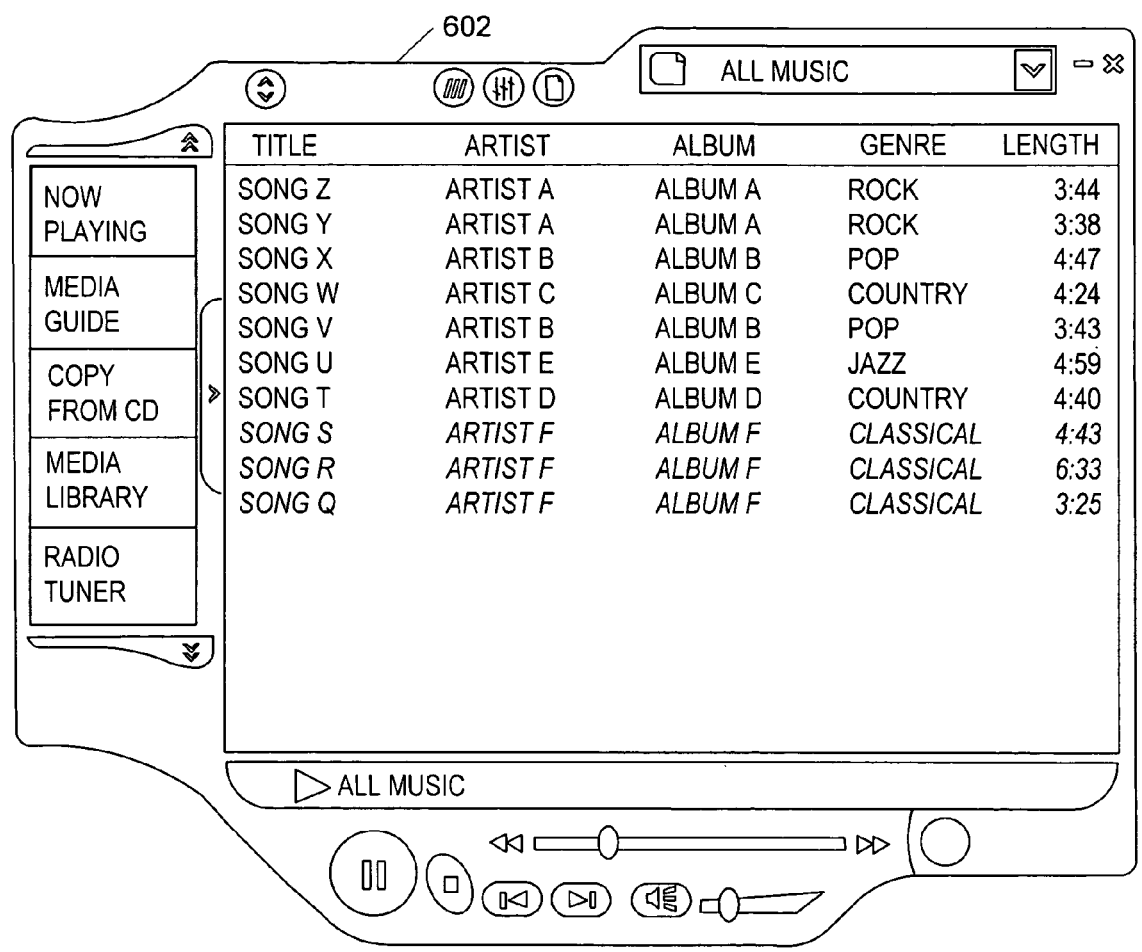
FIG. 3 is a screen shot illustrating an exemplary embodiment of an organizational application program manipulating the stored metadata.
Figure 4:
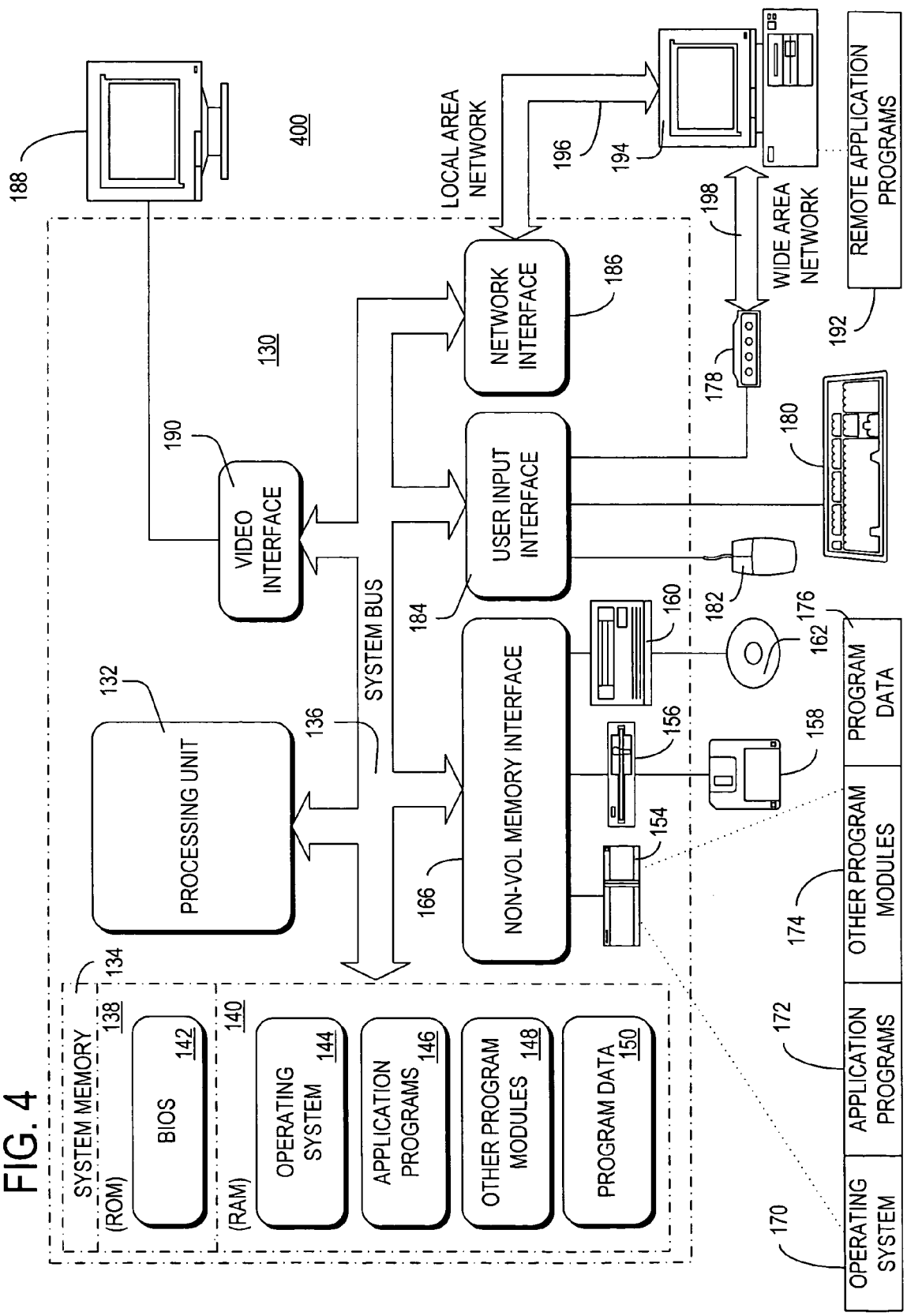
FIG. 4 is a block diagram illustrating one example of a suitable computing system environment in which the invention may be implemented.

Referring next to FIG. 3, a screen shot illustrates an exemplary embodiment of an organizational application program manipulating the stored metadata. In FIG. 3, a media player application program displays metadata for media content stored locally as well as metadata for media content stored on another device (e.g., a consumer electronic device). In particular, Album F is stored on an external device that is currently offline as indicated by the italicized metadata.

Exemplary Operating Environment

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 2 to aggregate metadata from a plurality of computing or storage devices such as consumer electronic devices.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method for collecting metadata for media content, said method comprising:
    automatically detecting an event generated in response to connection of each of a plurality of first devices to a second device, said first devices each having a media file stored thereon;
    determining an identifier associated with the media file in response to the detected event, said identifier identifying metadata associated with media content stored in the media file on the first devices;
    obtaining the identified metadata for the media file from a metadata provider using the determined identifier;
    storing the obtained metadata in a memory area associated with the second device;
    aggregating, on the second device, the stored metadata;
    displaying the aggregated metadata to a user via the second device;
    enabling the user to manipulate the aggregated metadata via the second device and to access the aggregated metadata on the second device after termination of the connection of one or more of the plurality of first devices to the second device; and
    altering the display of the aggregated metadata on the second device in response to said termination, wherein altering the display of the aggregated metadata comprises one or more of the following: dimming, shading, tinting, bolding, and italicizing.

2. The method of claim 1, wherein automatically detecting the event comprises automatically detecting a connection from a consumer electronics device.

3. The method of claim 1, wherein storing the obtained metadata in the memory area associated with the second device comprises storing the obtained metadata in a memory area associated with a media player.

4. The method of claim 1, wherein determining the identifier associated with the media file comprises querying the first devices.

5. The method of claim 1, wherein determining the identifier associated with the media file comprises accessing data stored on a computer storage medium of the first devices.

6. The method of claim 1, wherein obtaining the metadata for the media file from the metadata provider comprises obtaining the metadata for the media file from the first devices.

7. The method of claim 1, further comprising:
    prompting the user to determine whether to obtain the metadata associated with the media file from the metadata provider; and
    receiving a determination from the user in response to said prompting.

8. The method of claim 1, further comprising prompting the user to determine whether to add the obtained metadata to a media library associated with the second device; and receiving a determination from the user in response to said prompting.

9. The method of claim 1, wherein the memory area stores metadata for a media file stored on an external device.

10. The method of claim 1, wherein automatically detecting the event comprises automatically detecting a connection from one or more of the following: a portable device, an external device, a handheld device, a computing device, and a storage device.

11. The method of claim 1, wherein obtaining the metadata for the media file from the metadata provider using the determined identifier comprises obtaining metadata for the media file from a web service using the determined identifier.

12. The method of claim 1, further comprising retrieving metadata from the media file.

13. The method of claim 1, wherein obtaining the metadata for the media file from the metadata provider using the determined identifier comprises downloading the metadata from a network.

14. The method of claim 1, wherein automatically detecting the event comprises processing an event generated by creation of a connection by the first devices.

15. The method of claim 1, wherein the event comprises one or more of the following: a device event, an autoplay event, a change event, and a notify event.

16. The method of claim 1, wherein automatically detecting the event comprises automatically detecting an event generated in response to storage of another media file on the first devices.

17. The method of claim 1, wherein storing the obtained metadata in the memory area associated with the second device comprises storing the obtained metadata in a file system of a personal computer.

18. The method of claim 1, wherein automatically detecting the event comprises automatically detecting the insertion of a compact disc into a personal computer.

19. The method of claim 1, wherein the first devices has write capability, and further comprising storing the obtained metadata on the first devices.

20. The method of claim 1, wherein determining the identifier associated with the media file comprises determining bibliographic metadata for the file.

21. The method of claim 1, wherein one or more computer storage media have computer-executable instructions, and further comprising executing said computer-executable instructions to perform said detecting, said determining, said obtaining, said storing, and said enabling.

22. The method of claim 1, further comprising:
disconnecting the first devices from the second device; and
enabling the user to manipulate the metadata stored on the second device after said disconnecting.

23. One or more computer storage media having computer-executable components for collecting metadata for media content, said components comprising:
a driver component for automatically detecting a connection from one or more of a plurality of first devices to a second device upon creation of the connection by the first devices, said first devices each having a media file stored thereon;
an identification component for identifying metadata associated with media content stored in the media files on the first devices in response to the detected connection;
a user interface component for prompting a user to determine whether to obtain the metadata associated with each of the media files from a metadata provider, and receiving a determination from the user in response to said prompting;
a retrieval component for obtaining from the metadata provider the metadata identified by the identification component for the media content;
a storage component for storing the metadata obtained by the retrieval component in a memory area associated with the second device;
an application component for enabling the user to manipulate, via the second device, the metadata stored on the second device by the storage component;
an application component for aggregating, on the second device, the metadata stored on the second device by the storage component and enabling the user to access the aggregated metadata on the second device after termination of the connection of one or more of the first devices to the second device; and
a display component for displaying to the user via the second device the metadata obtained by the retrieval component, wherein the display component further alters the display of the obtained metadata on the second device in response to said termination, wherein altering the display of the obtained metadata comprises one or more of the following: dimming, shading, tinting, bolding, and italicizing.

24. The computer storage media of claim 23, wherein the retrieval component obtains the metadata identified by the identification component for the media content from a web service.

25. The computer storage media of claim 23, wherein the storage component stores the obtained metadata in a memory area associated with a media player.

26. A system for collecting metadata for media content, said system comprising:
a memory area for storing metadata for media content, said media content being stored on a plurality of first devices, said memory area being associated with a second device; and
a processor associated with the second device, said processor configured to execute computer-executable instructions for:
automatically detecting a connection from one or more of the first devices to the second device upon creation of the connection by the first devices;
identifying the metadata associated with the media content stored in the media files on the first devices in response to the detected connection;
obtaining the identified metadata for the media content from a metadata provider;
storing the obtained metadata in the memory area of the second device;
aggregating, on the second device, the stored metadata;
displaying the aggregated metadata to a user on the second device;
enabling the user to manipulate the aggregated metadata via the second device and to access the aggregated metadata on the second device after termination of the connection of one or more of the first devices to the second device; and
altering the display of the aggregated metadata on the second device responsive to said termination, wherein altering the display of the aggregated metadata comprises one or more of the following: dimming, shading, tinting, bolding, and italicizing.

27. The system of claim 26, wherein the first devices comprises one or more of the following: a computing device, a storage device, and a consumer electronic device.

28. The system of claim 26, wherein the second device comprises a personal computer.

29. The system of claim 26, wherein the memory area comprises a metadata repository associated with a media player.

* * * * *

UNITED STATES PATENT AND TRADEMARK OFFICE
CERTIFICATE OF CORRECTION

PATENT NO. : 7,650,563 B2  Page 1 of 1
APPLICATION NO. : 10/873599
DATED : January 19, 2010
INVENTOR(S) : Plastina et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1149 days.

Signed and Sealed this

Twenty-eighth Day of December, 2010

David J. Kappos
*Director of the United States Patent and Trademark Office*